Patented Jan. 17, 1950

2,494,550

UNITED STATES PATENT OFFICE 2,494,550

REFINED ROSIN PRODUCTS AND PROCESSES

Burt L. Hampton, Jacksonville, Fla., assignor, by mesne assignments, to The Glidden Company, Cleveland, Ohio, a corporation of Ohio No Drawing. Application February 23, 1946, Serial No. 649,772

10 Claims. (Cl. 260—105)

The present invention relates to the improvement of rosin and polymerized rosin, and particularly relates to such products which have diminished yellowing properties when made into soaps.

Soaps made from rosin yellow rapidly. This is true even in the case of the highest grade rosin, and is worse in this respect in the case of wood rosin than in the case of gum rosin. Apparently ordinary oxidation is not the principal cause of this yellowing. Instead, it appears that the yellow color is developed by reaction of alkali with certain unknown constituents of rosin. For instance, a hard cake of rosin-containing soap which is fairly white, when made, will yellow uniformly throughout the soap on aging. Similar discoloration occurs in the case of alkaline rosin sizes.

It is accordingly an object of the present invention to provide rosins and polymerized rosins which show improved resistance to yellowing when made into soaps and to provide soaps made from such rosins or polymerized rosins.

An additional object is to provide a process for preparing rosins and polymerized rosins which show improved resistance to yellowing when made into soaps.

Another object is to provide an improved rosin material for sizes.

Other objects will be apparent to those skilled in the art from the following description.

It has been found that the objects of the present invention are accomplished if rosin or polymerized rosin is treated with selenium in the presence of sufficient alkali to partially neutralize the rosin acids and form an alkali metal soap. Apparently the alkali used to neutralize the rosin reacts with yellowing constituents of rosin to yield products which are destroyed by the treatment with selenium. When soap curds are made from ordinary rosin, the mother liquor has a strong yellow color and the soap itself is yellow. When pure sodium rosinate is made from the rosin prepared according to the present invention, the mother liquor is nearly as clear and colorless as water, and the soap curds are fairly white and show little tendency to yellow on aging.

Ordinary gum rosin and ordinary polymerized rosin treated according to the present invention are apt to exhibit an accentuated fluorescence. This fluorescence is believed to be due to metals which are ordinarily dissolved in the rosin during the collection of the gum in which metal gutters and cups are used. If this tendency to exhibit fluorescence is to be overcome, these metals should be removed. It is therefore preferred to subject the rosin to an acid wash to remove these metals, so that the metal content is reduced to less than about .001% or .002%. Such rosin is substantially metal-free. However, it should be kept in mind that even though the rosin is not metal-free and hence shows fluorescence, it still will make a good soap, although the curds from such a rosin have the appearance of being slightly dirty.

The amount of alkali which is used is preferably not in excess of that which will produce crystallization of the alkali resinate. In the case of sodium hydroxide, this amount is about 5% by weight of rosin. This corresponds to about 38% of resin saponified. That is, not more than about 38% of the stoichiometric quantity of alkali needed to neutralize the rosin is employed. This quantity will produce about 40% of soap by weight of the original rosin. Thus, the amount of soap formed should not exceed about 40% by weight of the original rosin. Preferably, at least about 10% of the stoichiometric quantity of alkali needed to neutralize the rosin should be present, but lesser quantities in excess of the minimum effective amount may be used. Any suitable alkali metal alkali may be used, such as the hydroxides, oxides, and carbonates of sodium, potassium, etc. Also, the alkali metal dissolved in alcohol may be used.

The amount of selenium may vary over limited ranges as indicated in the following table, the percentages being based on the weight of the rosin to be treated.

| | Per cent |
|---|---|
| Selenium effective limits | .1 to 1 |
| Selenium practical limits | .1 to .7 |
| Selenium preferred limits | .15 to .3 |

The practical limits indicated above are those which would normally be encountered in plant operations.

Mixtures of selenium and sulfur may also be used. Preferably, the sum of the amounts of each element in the mixture should not exceed about 5% by weight of the rosin. A mixture which has been found particularly useful is made up to contain selenium about .15% on the rosin and sulfur about 2% on the rosin. This mixture may be used as a blend, or the selenium may be introduced first, reacted, and the sulfur then added.

In my co-pending application Serial No. 649,775 filed on even date herewith is disclosed a process for treating rosin material with sulfur to stabilize it and increase its resistance to yellowing when made into soaps and sizes.

Compounds of selenium which yield selenium under the conditions of the treatment may be used in place of the elemental material, or in a mixture with the elemental material, on a stoichiometric basis. Such compounds are selenium oxide and selenium halides.

The temperature of the heat treatment may vary considerably, but in general the temperature should be between 200° C. and 375° C. The time of treatment may also vary. From the following examples it will be understood that the time, the temperature, and the amount of selenium may be varied over limited ranges because these three factors are somewhat dependent upon each other. Thus, the higher the temperature, the shorter the time; and the larger the amount of selenium, the less severe the heat treatment should be in respect to temperature and time. The factors of time, temperature, and concentration of the catalytic material should be chosen such that the degree of unsaturation of the abietyl compounds of the rosin or polymerized rosin will be decreased without aromatization of substantially more than one ring of the rosin compounds. A time period of one to three hours at a temperature of around 275° C. is generally satisfactory with selenium concentrations between about 0.1% and 0.7%. Since aromatic compounds are rather easily sulfonated, sulfonation by the method described hereinafter may be employed as a measure of the extent of aromatization. The specific optical rotation of the treated rosin or polymerized rosin may be compared with that of the untreated rosin material as a further test of aromatization. The gain in weight of samples exposed to the air, or a test for iodine number, may serve as guides to the extent of change effected in the unsaturation of the rosin materials. Preferably, however, the effectiveness of the treatment is observed by its effect on the color developed in soap made from the treated rosin material.

It is also preferred to remove volatile products formed during the reaction. This may be done by sparging the molten reaction mass with steam, carbon dioxide, or nitrogen, or by subjecting the reaction mass to reduced pressure or vacuum distillation. It is advantageous also to provide a protective atmosphere around the reaction mass during most or all of the treatment. Carbon dioxide or nitrogen may be used while heating up and while reacting the mass. Steam may then be applied while cooling the mass, although carbon dioxide or nitrogen could be used to advantage during the cooling stage to remove water vapor. It should be recognized that a protective atmosphere is not essential to the process, since a good product is obtained in the absence of an inert gas if a large quantity of the material is treated in a closed vessel.

The following examples are illustrative of the effect of selenium.

EXAMPLE I 480 parts of gum rosin, grade X, derived from gum from which the metals had been removed by an acid wash, was preliminarily heated to 160° C. and 2 parts of sodium dissolved in 20 parts of methyl alcohol added together with 1.44 parts of selenium. The reaction mass was then heated to 275–285° C. and held at this level for 3 hours with stirring. It was then steam distilled at 265–275° C. for 30 minutes. The product had a grade of 7A (French scale); an acid number of 133, and the optical rotation was $alpha_D+48°$. Soap curds made from this resin were white when first prepared and only a slight yellow color developed on standing for several weeks.

EXAMPLE II 546 parts of WW gum rosin prepared from acid washed gum was heated to 150° C. and 16 parts of 50% NaOH added slowly together with 1.64 parts of selenium. The reaction mass was then heated with stirring to 275–285° C. for 3 hours and then steam distilled at 265–275° C. for 30 minutes. The product graded 5A, and the optical rotation was $alpha_D+43°$. Soap curds made from this resin developed only a pale yellow color on aging for many weeks.

EXAMPLE III 390 parts of metal-free WW gum rosin was heated to 200° C. and 23.4 parts of 50% NaOH solution added slowly, after which 1.17 parts of selenium was added and the mass heated to 275–285° C. for 3 hours, cooled to 200–230° C. and 23.4 parts of additional 50% NaOH solution added. By adding this additional NaOH, sodium rosinate developed a strong tendency to crystallize. 500 parts of mineral spirits was added and the solution refluxed. Sodium resinate which precipitated out, was filtered and washed with hexane. The yield of sodium resinate was 148 parts, having an optical rotation of $alpha_D+36°$. 206 parts of rosin was recovered from the filtrate after separation of the salt. The salt was snow-white in color, and when it was dissolved in water and the solution heated with stirring until curds could be separated, a very white soap was prepared which showed little tendency to yellow.

EXAMPLE IV 435 parts of metal-free gum rosin, WW grade, was heated to 200–220° C. and 36.8 parts of 50% NaOH added slowly, then 1.31 parts of selenium was added and heated to 275–285° C. for 3 hours with stirring. The product graded 5A (French scale) and gave very white soap curds which did not yellow appreciably on aging.

EXAMPLE V 500 parts of WW wood rosin was heated to 200–220° C. and 40 parts of 50% NaOH added together with 1.5 parts of selenium. This reaction mass was heated at 275–285° C. for 3 hours. The product was grade 5A (French scale) and the optical rotation was $alpha_D+34°$. The soap curds made from this resin were of good color and the strong tendency of wood rosin alkali metal resinates to yellow had been largely removed.

EXAMPLE VI 500 parts of polymerized gum rosin of melting point 98° (R. and B.), acid number 149, and grade WG was heated to 230° C. and 20 parts of a 50% solution of NaOH added together with 1 part of selenium. The reaction mass was heated to 275–285° C. for 1¼ hours. The product was opaque and fluorescent. Melting point 98° C.; acid number 106; $alpha_D+28°$. Athough this resin was opaque and fluorescent, it made a fairly white soap which showed little tendency to yellow on standing.

EXAMPLE VII 425 parts of polymerized rosin, grade N, melting point 102° (R. and B.) was heated to 220° C. and 25 parts of 50% NaOH solution added together with 0.85 parts of selenium. The reaction mass was heated to 275–285° C. for 1½ hours. The product was opaque and fluorescent, had an acid number of 93, R. and B. melting point 112°, and an optical rotation of alpha$_D$+19°. It made a fairly white soap with little tendency to yellowing on standing.

EXAMPLE VIII (A blank)

500 parts of metal-free WW gum was heated to 160° C. and 30 parts of a 50% NaOH solution by weight was added slowly. The reaction mass was heated to 275–285° C. for 3 hours and then steam distilled at 265–275° C. for 30 minutes. The product graded WW-X, and the optical rotation was alpha$_D$+7°. Soap curds made from this resin were of much better color than those made with ordinary rosin, but they showed a strong tendency to yellow on standing.

EXAMPLE IX (A blank)

150 parts of WW gum rosin which had been acid-washed to remove its metal content was heated at 275–285° for 3 hours. Grade WW+; acid number 154; R. and B. M. P. 75°.

In the foregoing examples, the grades 5A and 7A are according to the French scale and are both lighter than the standard for grade X of the United States Department of Agriculture scale.

The tests made in the foregoing examples were made as follows:

(1) All melting points were determined by the ring and ball method, and are reported on the centigrade scale.

(2) Optical rotations were run in about 2% concentration in 95% ethanol and calculated to specific rotation (alpha$_D$).

(3) *Preparation of soap curds.*—Fifty milliliters of water was brought to a boil in a 400 ml. beaker and 13 grams of powdered rosin was added. When the rosin had melted, 3 ml. of 50° Bé. sodium hydroxide was added; the solution was stirred until it thickened; then 20 ml. of 50° Bé. sodium hydroxide was added, and the mass was stirred vigorously until curdy. The curds were then separated from the water.

(4) If sulfonating tests are to be made for dehydroabietic acid, they are conveniently made by sulfonating 50 g. samples with 200 ml. concentrated sulfuric acid at 10°–15° C., pouring the reaction mixture into about one liter of water, separating crude sulfonation product from the dilute sulfuric acid and extracting the water-soluble sulfodehydroabietic acid with boiling water.

It should be understood that soaps and sizes made from my improved rosin materials may include other ingredients customarily included in such products. Thus the soaps may include either major or minor amounts of a saponified material selected from the class consisting of fats, fatty acids, saponifiable oils, and the partial saponification products thereof. Sizes may include such saponified materials also, with or without a variety of other ingredients customarily used in sizes to effect particular results, functions, properties, or characteristics.

In the following claims, the term "rosin material" is used generically to refer to gum, wood, or polymerized rosin, all or any of which may contain metals, may be naturally free of metals, or may have been acid-washed to remove the metals.

Having described the invention, what is claimed is:

1. The process of producing an improved rosin composition characterized by imparting an increased resistance to yellowing in soaps and sizes made therefrom, which process consists of heating a rosin material under non-oxidizing conditions with from 0.1% to 1% of selenium derived from at least one catalytic material selected from the group consisting of selenium, selenium oxide and selenium halides, in the presence of an effective amount up to about 38% of the stoichiometric quantity of an alkali metal alkali required to neutralize the rosin material, at a temperature between about 200° C. and 375° C. for a time sufficient to decrease the degree of unsaturation without aromatization of substantially more than one ring of the rosin material.

2. The process of producing an improved rosin composition characterized by imparting an increased resistance to yellowing in soaps and sizes made therefrom, which process consists of heating a rosin material under non-oxidizing conditions with from 0.1% to 0.7% of selenium in the presence of from about 5% to about 38% of the stoichiometric quantity of an alkali metal alkali required to neutralize the rosin material at a temperature of 200° to 375° C. for a time sufficient to decrease the degree of unsaturation without aromatization of substantially more than one ring of the rosin material.

3. The process of producing an improved rosin composition characterized by imparting an increased resistance to yellowing in soaps and sizes made therefrom, which process consists of heating a rosin material under non-oxidizing conditions with from 0.1% to 1% in selenium equivalent of at least one catalytic material selected from the group consisting of selenium, selenium oxide and selenium halides, in the presence of from about 5% to about 38% of the stoichiometric quantity of an alkali metal alkali required to neutralize the rosin material, at a temperature between about 200° C. and 375° C., for a time sufficient to decrease the degree of unsaturation without aromatization of substantially more than one ring of the rosin material; and thereafter removing volatile reaction products from the treated rosin material while in liquid phase.

4. The process of producing an improved rosin soap characterized by and having increased resistance to yellowing when aged, which process consists of heating a rosin material under non-oxidizing conditions with from 0.1% to 1% in selenium equivalent of at least one catalytic material selected from the group consisting of selenium, selenium oxide and selenium halides, in the presence of from about 5% to about 38% of the stoichiometric quantity of an alkali metal alkali required to neutralize the rosin material, at a temperature between about 200° C. and 275° C. for a time sufficient to decrease the degree of unsaturation without aromatization of substantially more than one ring of the rosin material; thereafter removing volatile reaction products from the treated material; and converting said treated material to soap.

5. The process of claim 3 wherein the catalytic material is selenium in amounts of from 0.1% to 0.7%.

6. The process of claim 4 wherein the catalytic material is selenium in amounts of from 0.1% to 0.7%.

7. The process of claim 3 wherein the catalytic material is selenium in amounts of from 0.15% to 0.30%.

8. The process of claim 4 wherein the catalytic material is selenium in amounts of from 0.15% to 0.30%.

9. An improved rosin soap characterized by diminished tendency to yellow on aging, its rosin content being produced by the process claimed in claim 1.

10. An improved rosin soap characterized by diminished tendency to yellow on aging, its rosin content being produced by the process claimed in claim 5.

BURT L. HAMPTON.

REFERENCES CITED

The following references are of record in the file of this patent:

UNITED STATES PATENTS

| Number | Name | Date |
|---|---|---|
| 2,085,151 | Georgi | June 29, 1937 |
| 2,351,949 | Georgi | June 20, 1944 |
| 2,359,404 | Colgate et al. | Oct. 3, 1944 |